United States Patent
Lu et al.

(10) Patent No.: US 8,457,017 B2
(45) Date of Patent: Jun. 4, 2013

(54) MULTI-CHASSIS INTERCONNECT

(75) Inventors: Biao Lu, Cupertino, CA (US); Vinay Ravuri, Santa Clara, CA (US); How Tung Lim, San Jose, CA (US); Kamran Farshchi, Wexford, PA (US); Yatindra Chugh, Sunnyvale, CA (US); Sharfuddin Syed, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 466 days.

(21) Appl. No.: 11/426,576

(22) Filed: Jun. 26, 2006

(65) Prior Publication Data

US 2007/0005968 A1   Jan. 4, 2007

Related U.S. Application Data

(60) Provisional application No. 60/695,522, filed on Jun. 30, 2005, provisional application No. 60/759,420, filed on Jan. 17, 2006.

(51) Int. Cl.
*H04L 12/28* (2006.01)

(52) U.S. Cl.
USPC .......................................... 370/256

(58) Field of Classification Search
USPC ............................................ 370/256; 713/168
See application file for complete search history.

(56) References Cited

U.S. PATENT DOCUMENTS

| | | | |
|---|---|---|---|
| 5,521,910 A * | 5/1996 | Matthews | 370/256 |
| 6,188,694 B1 | 2/2001 | Fine et al. | |
| 6,697,359 B1 * | 2/2004 | George | 370/357 |
| 6,801,506 B1 * | 10/2004 | Dey | 370/256 |
| 6,826,195 B1 * | 11/2004 | Nikolich et al. | 370/465 |
| 2003/0026209 A1 * | 2/2003 | Katz | 370/238 |
| 2003/0031177 A1 * | 2/2003 | Robidas et al. | 370/392 |
| 2003/0099247 A1 * | 5/2003 | Toutant et al. | 370/401 |
| 2005/0060413 A1 * | 3/2005 | Oyadomari et al. | 709/227 |
| 2005/0091304 A1 * | 4/2005 | Trayler | 709/200 |
| 2005/0222815 A1 * | 10/2005 | Tolly | 702/185 |
| 2006/0007951 A1 * | 1/2006 | Meier | 370/449 |
| 2007/0258446 A1 * | 11/2007 | Smith et al. | 370/389 |

* cited by examiner

*Primary Examiner* — Dang Ton
*Assistant Examiner* — Nourali Mansoury
(74) *Attorney, Agent, or Firm* — North, Weber & Baugh LLP; David L. Soltz

(57) ABSTRACT

The present invention provides a system, apparatus and method for providing point-to-point inter-chassis connections within chassis systems and/or network nodes. Multi-chassis systems within a network employ a protocol wherein a peer discovery process is initiated and the discovered neighbors are authentically verified before establishing an active state between point-to-point inter-chassis links.

8 Claims, 3 Drawing Sheets

MULTI-CHASSIS INTERCONNECT

CROSS REFERENCE TO RELATED PATENT APPLICATIONS

This application claims priority to U.S. Provisional Application Ser. No. 60/695,522, entitled "Protocol for Multi-Chassis Interconnect," filed Jun. 30, 2005, and to U.S. Provisional Application Ser. No. 60/749,420, entitled "Protocol for Multi-Chassis Interconnect," filed Jan. 17, 2006, both applications are incorporated herein by reference in their entirety.

BACKGROUND

A. Technical Field

The present invention relates generally to network management and more particularly, to management of interconnections between multiple chassis within a system and/or network node.

B. Background

Network nodes may contain multiple chassis that need to be properly connected in order for the node to function correctly. The chassis configuration in the node may require that certain chassis be connected within a first system and certain other chassis be connected in a second system. The connection configurations within these systems may require a certain connection topology in order to ensure that the node(s) operate appropriately. In such an environment, there is a risk that inter-chassis connections may be incorrect and damage the performance of the node and the chassis therein.

Multi-chassis systems may employ a link management protocol, such as spanning tree protocol that is known within the art. Spanning tree protocols provide path redundancy while preventing undesirable loops in the network. These undesirable loops may create duplicative, active paths between chassis within a node or between multiple nodes. As a result, these loops, within a network topology, should be properly configured to ensure that commands and messages are received at the proper destination and that these messages are not inadvertently duplicated within the topology.

Although a spanning tree protocol reduces the frequency of these undesired loops, it does not provide neighbor discovery and link level monitoring. For instance, if two multi-chassis systems are connected via an Ethernet link, there is no authentication to prevent undesired Ethernet traffic from going between the two systems.

Before any interconnect between multiple chassis is made, it is essential to ensure that connections are provided between authenticated chassis. It is crucial to discover valid chassis neighbors, which can be connected to each other by point-to-point links. Further, it is also required to make sure that there are no inappropriate pre-existing connections between the various chassis in a system or at the intra-system level. In a scenario of multiple systems, it is also required to ensure that no connection exists within chassis that does not belong to same system or node.

Oftentimes, these chassis are connected by cables that are installed by a network administrator during installation. These connections may also be changed or modified after installation. This installation and maintenance procedure creates a risk that one or more connections may be performed incorrectly. If a connection is incorrectly done, the chassis, system and/or node may not operate properly.

Authentication of these connections is typically performed by the network administrator by visually inspecting the node. If a failure in the node is detected, an administrator may need to visually check each port connection on the various chassis to identify a faulty connection and/or verify that the node is properly configured. Such a process is time consuming and may create additional incorrect connections within a node.

SUMMARY OF THE INVENTION

The present invention discloses a system, apparatus and method for providing active connections between multiple chassis in a network through system inter-chassis discovery, authentication, and monitoring.

In one embodiment of the present invention, a network of multi-chassis systems is provided and each system within the network may comprise one or more chassis having at least one port. Various point-to-point links within the network may be provided such that each link connects one port of a chassis to another port of another chassis.

According to one embodiment of the present invention, at least one chassis within each system is configured as a master chassis that may include several modules that discover, authenticate, and maintain inter-chassis connections. For example, the master chassis may have a module for providing information packets (e.g., Ethernet packets) that can be communicated between a sender chassis and a receiver chassis. Another module within the master chassis may store a list of authorized chassis belonging to a particular multi-chassis system. This master chassis, and other chassis with the system, may be configured and updated manually or automatically.

In one embodiment of the invention, the information packets may be sent by a sender chassis to a receiver chassis over the point-to-point links to set-up and/or authenticate inter-chassis connections. The information packet may contain a system ID, a chassis ID and a port ID of the sender chassis and a system ID, a chassis ID and a port ID of a remote chassis to which a connection would like to be made. When a receiver chassis receives the information packet, the system ID, chassis ID and port ID of the remote chassis is compared with its own IDs. An active link between sender chassis and receiver chassis is established and authenticated when it is found that the system ID, chassis ID and port ID of the receiver chassis matches with that of the sender chassis remote information. After the active link is authenticated, a spanning tree protocol is run over the active link.

The spanning tree protocol provides a spanning tree "hello" packet over the active link. This "hello" packet is modified to comprise a list of authorized chassis belonging to the system and is used to maintain a summary of authenticated chassis within the system.

Comparatively, the link between a sender chassis and a receiver chassis is declared as an inactive link when the system ID, chassis ID and port ID of remote chassis do not match with that of the receiver chassis. This inactive link is not allowed to carry spanning tree packets thereby preventing unnecessary inter-system traffic from occurring.

In one embodiment of the invention, each chassis in a system is also capable of transmitting the system ID of the system to which it belongs. If a chassis has not been identified within a system, the first packet having a system ID by the chassis will result in the chassis setting its system ID to this received system ID. If the system IDs match, then an analysis of chassis and port IDs is not performed. As a result, a provision is provided for allowing automatic authentication of new chassis and enabling "plug-n-play" service.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

A system, apparatus and a method are described for authentication of an inter-chassis connection within a node or nodes. In one embodiment of the invention, neighbor chassis connections are provided and point-to-point links between multiple chassis are authenticated. An active link is established only between authenticated chassis and a spanning tree protocol is employed over the active link.

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

Figure 1:
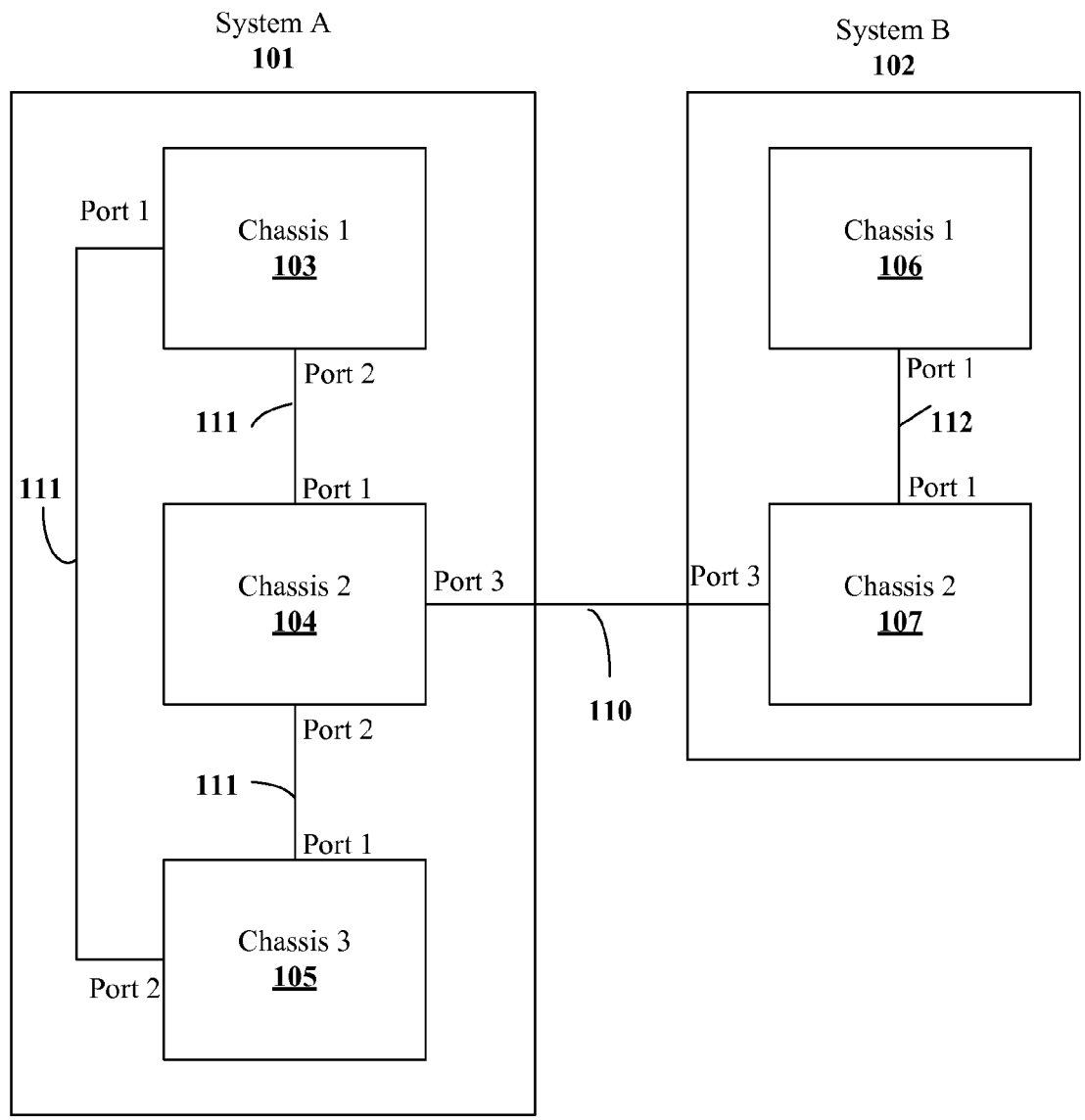
FIG. 1 is a schematic diagram that illustrates connections between two multi-chassis systems.

FIG. 1 illustrates a node having multi-chassis systems, system A 101 and system B 102. System A 101 comprises three chassis 103-105 and system B 102 comprises two chassis 106, 107. These chassis 103-107 are provided with one or more ports, which may be used for building point-to-point links 110-112 between these chassis 103-107. Each link 110-112 connects one port of a chassis to another port of another chassis.

An installation process occurs in which specific connections between the chassis 103-107 are created and links are established. Information packets, such as Ethernet packets, may be exchanged over the point-to-point links 110-112 to authenticate the links prior to activation. These packets may contain information relating to the system ID, chassis ID and port ID of the sender chassis and a remote system ID, chassis ID and port ID. Whenever the system ID, chassis ID and port ID of the receiver chassis matches with the corresponding ID values at the sender chassis remote information, the link between the sender and the receiver chassis is declared as "active" (up) link.

If there is any mismatch between the remote identification values received by the receiver chassis and its internal list of valid IDs, then that link is not authenticated and is declared as "inactive" (down). Referring to FIG. 1, a link 110 is shown that would not be authenticated. In this example, a packet from the second chassis 104 in node A 101 to the second chassis 107 in system B would contain remote IDs containing "System A", "Chassis 2", and "Port 3" fields. The system field would not match the system field in the receiving chassis 107 and an erroneous connection would be identified. As a result, the link 110 between second chassis 2 104 of system A and the second chassis 107 of system B would be declared as inactive and traffic would not be permitted on the link.

As soon as an active link is declared, a spanning tree protocol is run over the active link. Comparatively, the inactive link is not able to invoke the spanning tree protocol. In addition to the information packet, a list of chassis that are authorized for the system is provided. This list may also be sent along with spanning tree packets and maintained by a master chassis within the system. These packets are exchanged only within the system (e.g. within system A 101 or system B 102). If a chassis in a system is found not to be on the list, the modified spanning tree state machine will not move a port on the chassis to a forwarding state.

B. Layout of Master Chassis

Figure 2:
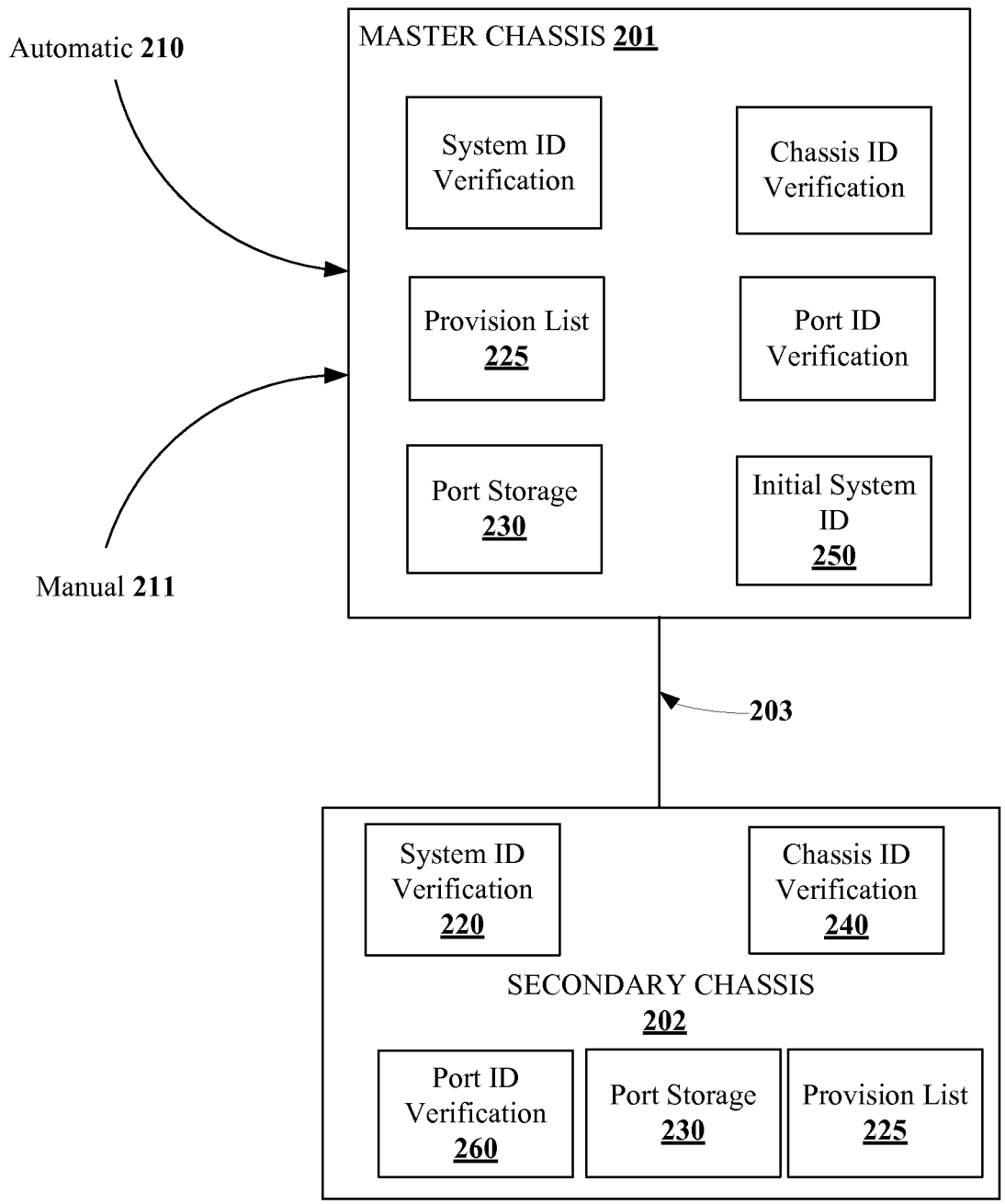
FIG. 2 illustrates a master chassis comprising a plurality of modules, the chassis being connected to a secondary chassis according to one embodiment of the invention.

FIG. 2 illustrates an exemplary master chassis within a chassis system and/or network node according to one embodiment of the invention. The master chassis 201 comprises a plurality of modules that provide and/or store information that may be sent and received over point-to-point links 203 within the network node. This plurality of modules may also be located on secondary or slave chassis within the system. In addition to this communicated information, these modules also provide a list of chassis, and their associated system, chassis and port identification values, which are authenticated within the system.

According to one embodiment of the invention, these modules include a system ID verification module 220, a provision list 225, a port storage 230, a chassis analysis module 240, and an initial system ID module 250. The master chassis 201 may be connected to one or more secondary chassis 202 through the point-to-point link 203.

The above-mentioned modules are responsible for providing active connections between multiple chassis in a network through system inter-chassis discovery, authentication, and monitoring processes. For exemplary purposes, these processes will be described in relation to the master chassis 201 and a secondary chassis 202. An information packet containing a system ID, a chassis ID and a port ID of the sender chassis and a system ID, a chassis ID and a port ID of a remote chassis is generated using data from the provision list 225 and the port storage module 230.

As mentioned earlier, the information packet and a list of authorized system IDs may be sent by a sender chassis to a receiver chassis over the point-to-point link 203. A system ID verification module 220 on the receiver chassis 202 verifies the matching of the remote system identification value to its own system Id, when the receiver chassis receives the information packet. A chassis ID verification module 240 verifies the matching of the remote chassis field to its own chassis ID when the chassis receives the information packet. A port ID verification module 260 verifies the matching of the remote port field to its own port ID.

An active link between sender chassis and receiver chassis may be established after analyzing that the system ID, chassis ID and port ID of remote chassis match with that of the receiver chassis. As soon as the active link is declared, the spanning tree protocol is run over the active link.

The spanning tree protocol is well know in the art (IEEE Standard 802.1D), and transmits a modified spanning tree "hello" packet over the active link 203. The list of authorized chassis belonging to the particular system is included within the modified spanning tree "hello" packet.

The initial system ID module 220 initiates the master chassis 201 to transmit the system ID. Initially, when a chassis is not identified and associated with a system, a packet from the initial system ID module 220 is received and used to set the chassis system ID. This feature allows automatic authentication of a new chassis and enables "plug-n-play" service when connecting into the system. The modules of master chassis 201 may be configured and updated manually or automatically.

The master chassis 201 may configured and maintained through a manual connection 211 or through an automatic mechanism 210.

C. Method for Authenticating an Inter-Chassis Connection

Figure 3:
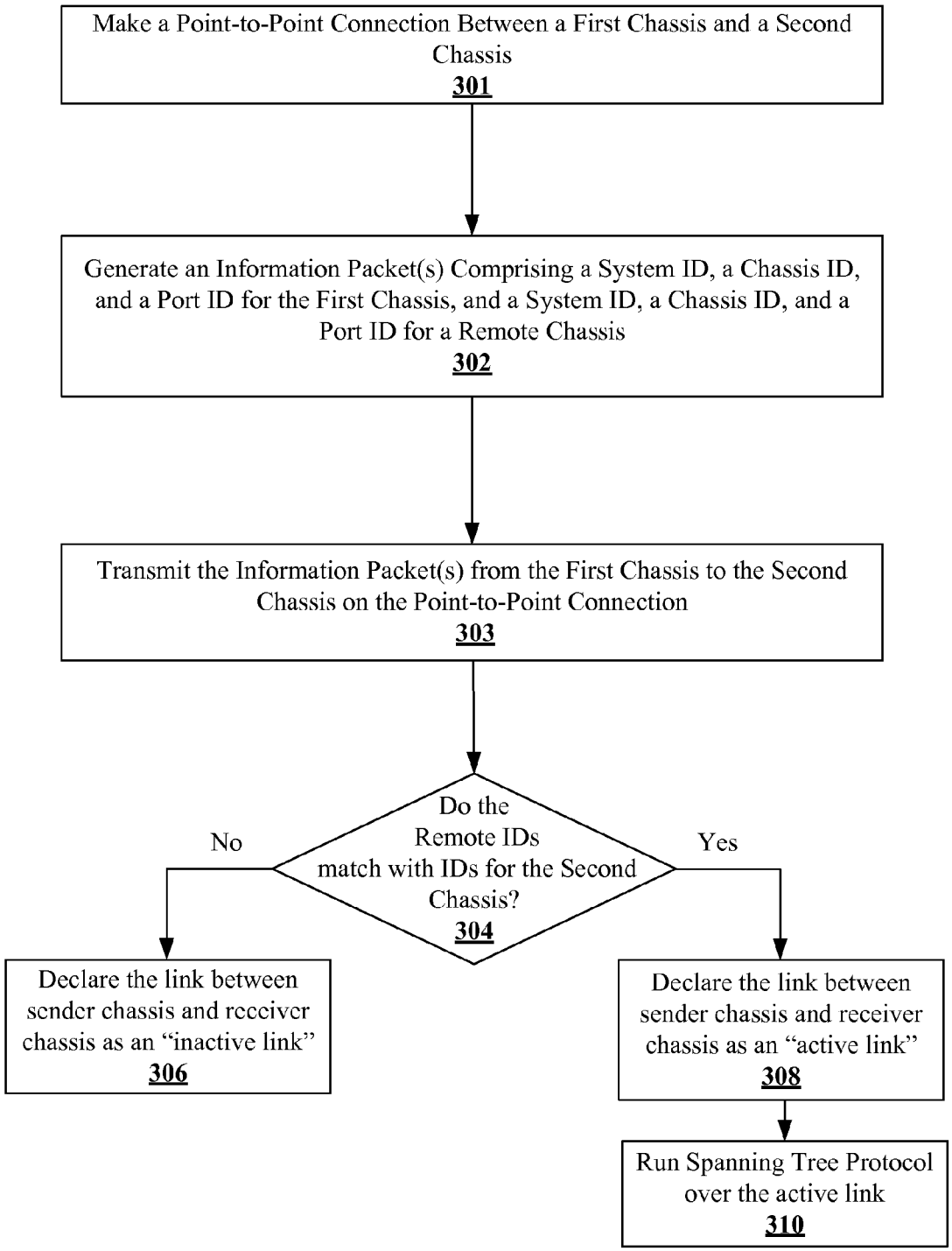
FIG. 3 is a flowchart illustrating a method for authenticating a inter-chassis connection according to one embodiment of the invention.

FIG. 3 is a flowchart illustrating a method, independent of structure, for authenticating an inter-chassis connection according to one embodiment of the invention. A point-to-point connection is made 301 between a first chassis and a second chassis. In one embodiment of the invention, the first chassis is a master chassis that controls an authentication process of the point-to-point connection.

An information packet(s) is generated 302 that comprises a system ID, a chassis ID, and a port ID associated with the first chassis and a system ID, a chassis ID and a port ID associated with a remote chassis. The first chassis transmits 303 this information packet(s) to the second chassis so that the remote ID values may be analyzed relative to its own ID values.

If there are mismatches in the comparison 304, then the inter-chassis connection is not activates 306 and data may not be transmitted on the corresponding link. For example, the inactive link is not allowed to carry spanning tree packets between the first and second chassis. Comparatively, if there are not any mismatches 304, the inter-chassis link is activated 308 and data may be communicated on this link. Thereafter, spanning tree protocol data may be transmitted 310 on the link.

The foregoing description of the invention has been described for purposes of clarity and understanding. It is not intended to limit the invention to the precise form disclosed. Various modifications may be possible within the scope and equivalence of the appended claims.

We claim:

1. A method comprising:
    generating a first packet, the first packet including first information;
    transmitting the first packet from a first chassis to a second chassis, the first packet including a system identifier that identifies a system in which the first chassis is provided, the second chassis lacking information identifying the system;
    storing the system identifier in the second chassis after the step of transmitting the first packet, such that the second chassis is identified with the system;
    transmitting a second packet including the first information, the first information including a chassis identifier that identifies the first chassis and a port identifier that identifies a port of the first chassis,
    determining that the first information matches second information stored in the second chassis;
    transmitting a plurality of third packets from the first chassis and the second chassis in accordance with a spanning tree protocol after said determining that the first information matches the second information, one of the plurality of third packets being a "hello" packet that includes a plurality of identifiers, each of which identifying a corresponding one of a plurality of third chassis, wherein the third plurality of chassis have active connections for communicating data to the second chassis.

2. The method of claim 1, further comprising the step of establishing a link between the first and second chassis in response to the first information matching the second information, the step of transmitting a plurality of second packets between the first chassis and the second chassis in accordance with the spanning tree protocol is in response to the step of establishing the active link.

3. An apparatus comprising:
    a first chassis and a second chassis, the first chassis being provided in a system, the first chassis outputting a system identifier that identifies the system to the second chassis, such that the second chassis lacks the system identifier when the system identifier is output from the first chassis;
    the second chassis storing the system identifier, such that the second chassis is identified with the system, the second chassis comprising:
        a module configured to receive first information from the first chassis and compare the received first information to second information stored in the second chassis, the first information including a chassis identifier that identifies the first chassis and a port identifier that identifies a port of the first chassis,
    wherein a plurality of packets are transmitted between the first and second chassis in accordance with a spanning tree protocol if the first information of the first chassis matches the second information of the second chassis, one of the plurality of packets being a "hello" packet that includes a plurality of identifiers, each of which identifying a corresponding one of a plurality of third chassis, wherein the plurality of third chassis have active connections for communicating data to the second chassis.

4. The apparatus of claim 3, wherein a provision list is updated in response to an output from the first chassis.

5. The apparatus of claim 4, wherein the first chassis is configured to be a master chassis.

6. The apparatus of claim 3, wherein the second chassis further comprises a memory, the memory being configured to store the second information.

7. The apparatus of claim 3, wherein the second chassis further comprises a memory, the memory configured to store data identifying a plurality of ports of the second chassis.

8. The apparatus of claim 3, wherein a link between the first and second chassis is established in response to the first information matching the second information, such that the plurality of packets are transmitted over the active link.

* * * * *